(12) United States Patent
Pistoia et al.

(10) Patent No.: US 8,745,578 B2
(45) Date of Patent: Jun. 3, 2014

(54) ELIMINATING FALSE-POSITIVE REPORTS RESULTING FROM STATIC ANALYSIS OF COMPUTER SOFTWARE

(75) Inventors: Marco Pistoia, Amawalk, NY (US); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 13/252,229

(22) Filed: Dec. 4, 2011

(65) Prior Publication Data
US 2013/0145215 A1    Jun. 6, 2013

(51) Int. Cl.
*G06F 9/44* (2006.01)
*G06F 9/45* (2006.01)

(52) U.S. Cl.
CPC ..................... *G06F 8/43* (2013.01)
USPC ............ 717/104; 717/141; 717/154

(58) Field of Classification Search
CPC ........................................ G06F 8/43
USPC ........................ 717/104, 141, 154
See application file for complete search history.

(56) References Cited

U.S. PATENT DOCUMENTS

| | | | |
|---|---|---|---|
| 5,987,252 A | 11/1999 | Leino et al. | |
| 7,284,274 B1 | 10/2007 | Walls et al. | |
| 7,549,144 B2 * | 6/2009 | Jubran | 717/143 |
| 7,617,489 B2 * | 11/2009 | Peyton et al. | 717/133 |
| 8,528,095 B2 * | 9/2013 | Haviv et al. | 726/25 |
| 2008/0244536 A1 | 10/2008 | Farchi et al. | |
| 2008/0289042 A1 | 11/2008 | Bai et al. | |

OTHER PUBLICATIONS

Dahse, "RIPS—A static source code analyser for vulnerabilities in PHP scripts", Aug. 23, 2010.*
Liang, "Static Vulnerabilities Detection Based on Extended Vulnerability State Machine Model", 2009.*
Cova et al. "Static Detection of Vulnerabilities in x86 Executables", 2006.*
Sherriff, "Analyzing Software Artifacts Through Singular Value Decomposition of Guide Development Decisions", 2007.*
Dan Brand et al., "Evidence-Based Analysis and Inferring Preconditions for Bug Detection", IEEE International Conference on Software Maintenance, 2007. ICSM Oct. 2007, pp. 44-53.

* cited by examiner

*Primary Examiner* — Phillip H Nguyen

(57) ABSTRACT

A system for eliminating false-positive reports resulting from static analysis of computer software is provided herein. The system includes the following components executed by a processor: a modeler configured to model a computer code into a model that defines sources, sinks, and flows; a static analyzer configured to apply static analysis to the code or the model, to yield reports indicative of at least one issue relating to one or more of the flows; a preconditions generator configured to generate preconditions for eliminating false-positive issues in the reports, based on the model and user-provided input; and a preconditions checker configured to apply the generated preconditions to the reports for eliminating false-positive issues in the reports.

18 Claims, 2 Drawing Sheets

ELIMINATING FALSE-POSITIVE REPORTS RESULTING FROM STATIC ANALYSIS OF COMPUTER SOFTWARE

BACKGROUND

1. Technical Field

The present invention relates to computer code analysis and more particularly, to eliminating false positive reports in such an analysis.

2. Discussion of the Related Art

While being instrumental in detecting elusive and complex problems, bugs, and vulnerabilities in computer software, static program analysis often errs on the conservative side by neglecting to represent important correlations between the artifacts it tracks. For example, a security analysis attempts to identify vulnerable information flows in an application. A report produced by such an analysis would comprise of a flow starting at a "source" statement (i.e., a statement reading untrusted user input into the context of the application) and ending at a "sink" statement (i.e., a statement performing a security-sensitive operation). While such a flow may be viewed as viable in isolation, it may be infeasible in the broader context of the entire application. Following is an example for two such flows that potentially exhibit a security issue:

```
String src = source( ); // SOURCE #1
String safeAgainstXSS = sanitizeForXss(src);
session.set("someSrc", src); // SINK #1
        Flow (1)
.....
String str = session.get("someSrc"); // SOURCE #2
xssSink(str); // SINK #2
        Flow (2)
```

As illustrated by the above two flows, both of the flows are valid and may stand by their own. However, as the session object is global across requests, injecting vulnerable content into it may invoke a security problem, so that content read from it might be considered untrusted. On the other hand, if both flows are taken together, they may cancel out each other so that the security problem is actually a non issue.

The aforementioned example points out an important source of false-positive reports. An existing static analyzer would report an issue on the code including flows 1 and 2 explained above. This would ignore, however, the fact that these two statements, when combined, may cancel each other, thus eliminating the security problem.

As another example, an entire flow may be enclosed inside a DEBUG flag, which is turned off automatically when the system is deployed. Finally, a flow may be viable only if another flow (or set of flows) is also present in the report. Using the example of security analysis again, consider an application that owns a database (i.e., the database is used only by this particular application, which is fairly common), and consider the following sequence of statements inside the application:

```
String userName = readUntrustedInfoFromDb("userName");
sensitiveOperation.perform(userName);
```

Clearly, these two statements pose as a vulnerable flow when viewed in isolation. However, if there is no corresponding flow showing that untrusted information has ever been written to the database, then no security attack can result from executing the two lines above.

To conclude, a large number of false-positive reports produced by the static analyzer is not the result of overapproximation in the report itself (when viewed in isolation), but rather, the problem is that in the wider context in which the flow is embedded, it loses its viability. To our knowledge, this observation has not been addressed to date by static-analysis tools. In fact, our experience with existing tools suggests that in some cases, the same block of code is reported both as dead code and as containing security vulnerability.

BRIEF SUMMARY

One aspect of the present invention provides a system for eliminating false-positive reports resulting from static analysis of computer software is provided herein. The system includes the following components executed by a processor: a modeler configured to model a computer code into a model that defines sources, sinks, and flows; a static analyzer configured to apply static analysis to the code or the model, to yield reports indicative of at least one issue relating to one or more of the flows; a preconditions generator configured to generate preconditions for eliminating false-positive issues in the reports, based on the model and user-provided input; and a preconditions checker configured to apply the generated preconditions to the reports for eliminating false-positive issues in the reports.

Other aspects of the invention may include a method arranged to execute the aforementioned system and a computer readable program configured to execute the aforementioned system. These, additional, and/or other aspects and/or advantages of the embodiments of the present invention are set forth in the detailed description which follows; possibly inferable from the detailed description; and/or learnable by practice of the embodiments of the present invention.

Embodiments of the present invention address the challenge of enforcing correlation constraints (as exemplified above) by adding preconditions to issues reported by the static-analysis tool. For example, one precondition governing an SQL-injection report is that the value returned by the input function may contain problematic characters, such as '-'. Another precondition is that this flow must not reside in dead code. By exposing the preconditions associated with each of the issues and the postconditions it guarantees, the analysis can perform a post-processing step where issues whose preconditions are not fully satisfied are eliminated.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings.

Figure 1:
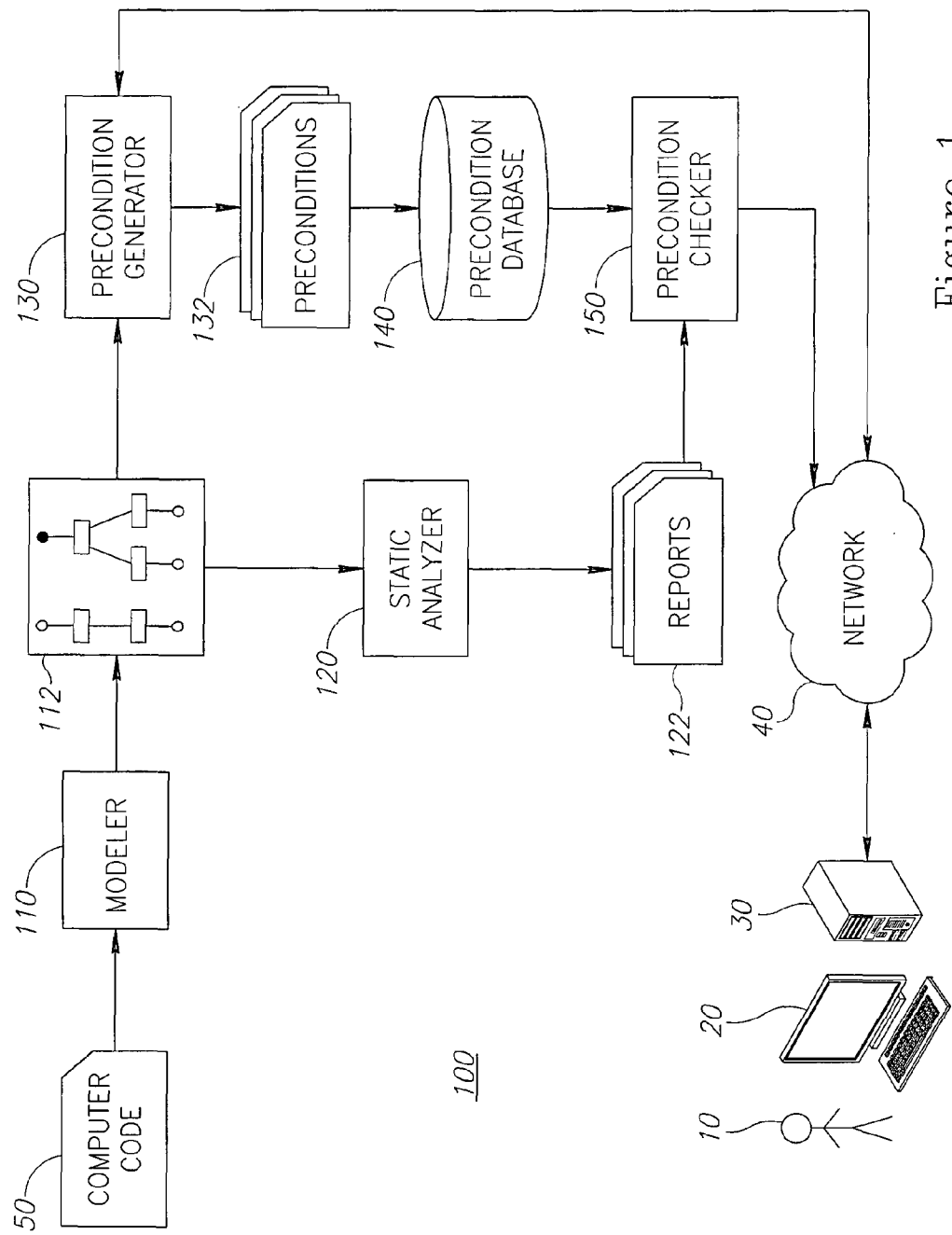
FIG. 1 is a high level schematic block diagram illustrating the environment of a system according to some embodiments of the invention.

The drawings together with the following detailed description make apparent to those skilled in the art how the invention may be embodied in practice.

DETAILED DESCRIPTION

Prior to setting forth the detailed description, it may be helpful to set forth definitions of certain terms that will be used hereinafter.

The term "static program analysis" or simply "static analysis" as used herein refers to the analysis of computer software that is performed without actually executing programs built from that software. In most cases the analysis is performed on some version of the source code and in the other cases some form of the object code. The term is usually applied to the analysis performed by an automated tool, with human analysis being called program understanding, program comprehension or code review.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating an environment 100 of a system according to some embodiments of the invention. An exemplary environment 100 may include a modeler 110 configured to receive a computer code 50 and produce in turn, a model 110 indicative of sources, sinks and flows that go between them. System 100 may further include a precondition generator 130, a preconditions database 140, a static analyzer 120, and a preconditions checker 150. A client computer 30 associated with a display 20 that acts as an interface for user 10, is connected via a network 40 to a server side that includes a static analyzer 120.

In operation, modeler 110 may be configured to model a computer code 50 into a model 112 that defines sources, sinks, and flows. Static analyzer 120 may be configured to apply static analysis to the code or the model, to yield reports 122 indicative of at least one issue relating to one or more of the flows. Additionally, preconditions generator 130 may be configured to generate preconditions 132 for eliminating false-positive issues in the reports 122, based on model 112 and user-provided input; and a preconditions checker 150 configured to apply the generated preconditions to the reports for eliminating false-positive issues in the reports.

Consistent with some embodiments of the present invention, at least one of the preconditions comprises checking whether a flow associated with an issue resides within a dead code portion. Additionally, and alternatively, at least one of the preconditions comprises checking whether a value returned by a specific flow contains one or more characters selected from a predefined list of characters.

Consistent with some embodiments of the present invention, at least one of the preconditions comprises checking whether specific path constraints that yields a specific issue, render the issue not viable and the flow associated with the path infeasible.

Consistent with some embodiments of the present invention, at least one of the preconditions comprises checking whether a specific flow is associated with a mode of execution selected from a predefined list of modes of code execution.

Consistent with some embodiments of the present invention, at least one of the preconditions comprises checking requirements on the history of an execution of a flow associated with an issue.

Figure 2:
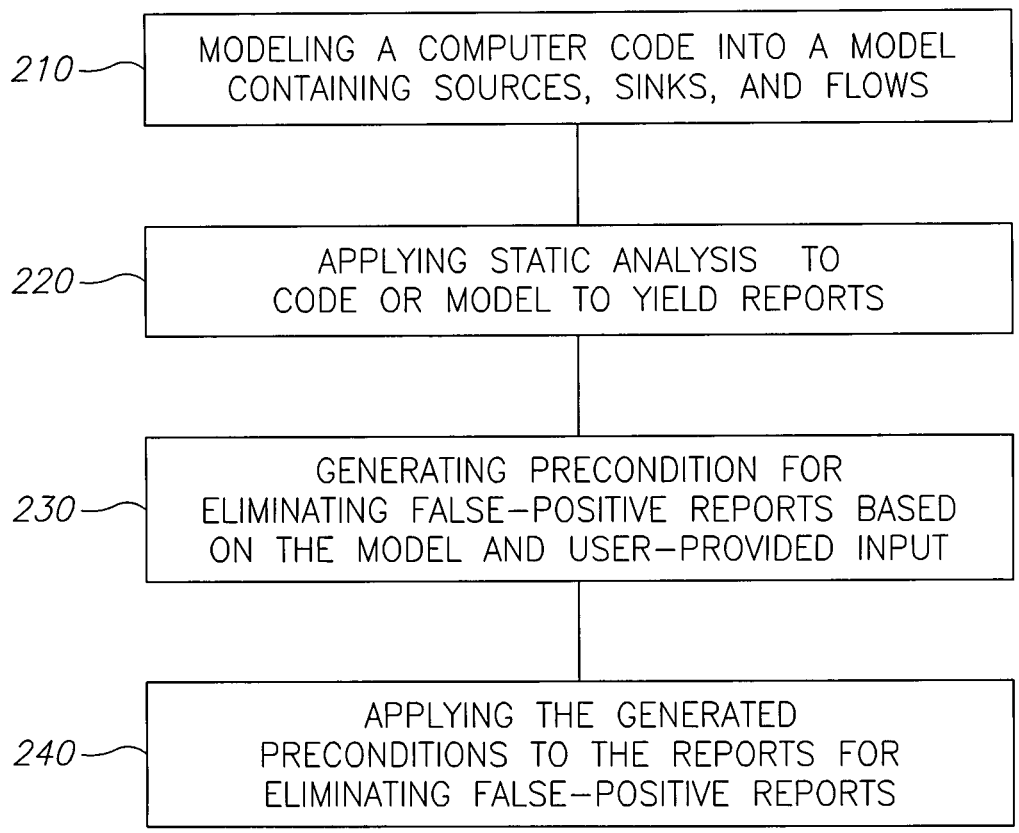
FIG. 2 is a high level flowchart illustrating a method according to some embodiments of the invention.

FIG. 2 is a high level flowchart diagram illustrating method 200 implementing embodiments of the invention. System 200 may not necessarily be implemented by aforementioned architecture of system 100. However, for clarity purposes, stages of method 200 are described herein in conjunction with components of system 100.

Method 200 starts off with the stage of modeling 210, possibly via modeler 110, a computer code 50 into a model 112 that defines sources, sinks, and flows. The method then goes on to the stage of applying 220 static analysis, possibly via static analyzer 120 to the code or the model, to yield reports 122 indicative of at least one issue relating to one or more of the flows.

Method 200 then goes on to the stage of generating preconditions for eliminating false-positive issues in the reports, based on the model and user-provided input. Method 200 then goes on to the stage of applying the generated preconditions to the reports for eliminating false-positive issues in the reports.

Embodiments of the present invention may be based upon predetermined precondition categories as follows:

The first category may be referred to as path constraints. In accordance with this category, an issue may be considered infeasible if the code paths leading to it are such that the constraints they manifest result in a state where the issue is not viable. For example, the code path leading to the supposedly vulnerable SQL-injection flow manifests the constraint that the input string can only contain English letters, which makes the flow infeasible. To expose this type of constraint, the issue can expose requirements on the state reaching it. (In the aforementioned example, the requirement is that the environment maps the result from readUntrustedInput("user-Name") to a string that may contain SQL meta-characters.)

A second category may be referred to as supporting evidence. In accordance with this category, an issue may be valid only if some supporting evidence is produced. Referring to the example of a write-read chain to a database earlier. To expose this kind of constraint, an issue should expose requirements on the history of the execution. This requirement can be satisfied either by matching it against the postconditions guaranteed by other issues or by observing a matching area in the code.)

A third category may be referred to as execution mode. In accordance with this category, some issues only make sense in a context where the application is deployed (and in particular, is not run in debug mode). Code governed by DEBUG flags tends to trigger more issues by the static analyzer for natural reasons. In the case of Web applications, for example, the execution mode extends beyond the DEBUG flag, and also states which container the application is run inside, etc. . . . This type of information is also crucial in determining whether an issue is viable. Again, this information can be exposed as a precondition, which can be verified against the code and/or the configuration resources (e.g., the Servlet XML) consumed by the application.

Naturally, the above classification can be extended or modified by taking into account domain-specific factors governing the behavior of the static analyzer. However, whatever language the analysis chooses for expressing preconditions and post conditions, the constraint-solving machinery would work equally well.

Advantageously, embodiments of the present invention address the most fundamental challenge faced by static-analysis tools, being false-positive reports. During research and experimentation, the inventors have discovered, that in many cases the report consists of hundreds (if not thousands) of issues, and a simple manual auditing effort reveals that the majority of these issues to be bogus. Specifically, the violations of preconditions such as the ones listed above are a primary cause for these false positive reports. As illustrated above, the aforementioned mechanism for generating and analyzing preconditions eliminates many of the false positive reports.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method comprising:
    modeling a computer code into a model that defines sources, sinks, and flows;
    applying static analysis to the code or the model, to yield reports indicative of at least one issue relating to one or more of the flows;
    generating preconditions for eliminating false-positive issues in the reports reports, based on the model and user-provided input; and
    applying the generated preconditions to the reports for eliminating false-positive issues in the reports,
    wherein at least one of the modeling, the applying, and the generating is executed by at least one computer processor.

2. The method according to claim 1, wherein at least one of the preconditions comprises checking whether a flow associated with an issue resides within a dead code portion.

3. The method according to claim 1, wherein at least one of the preconditions comprises checking whether a value returned by a specific flow contains one or more characters selected from a predefined list of characters.

4. The method according to claim 1, wherein at least one of the preconditions comprises checking whether specific path constraints that yields a specific issue, render the issue not viable and the flow associated with the path infeasible.

5. The method according to claim 1, wherein at least one of the preconditions comprises checking whether a specific flow is associated with a mode of execution selected from a predefined list of modes of code execution.

6. The method according to claim 1, wherein at least one of the preconditions comprises checking requirements on the history of an execution of a flow associated with an issue.

7. A system comprising:
    a processor;
    a modeler configured to model a computer code into a model that defines sources, sinks, and flows;
    a static analyzer configured to apply static analysis to the code or the model, to yield reports indicative of at least one issue relating to one or more of the flows;
    a preconditions generator configured to generate preconditions for eliminating false-positive issues in the reports, based on the model and user-provided input; and
    a preconditions checker configured to apply the generated preconditions to the reports for eliminating false-positive issues in the reports,
    wherein at least one of the modeler, the static analyzer, and the preconditions generator is executed by the processor.

8. The system according to claim 7, wherein at least one of the preconditions comprises checking whether a flow associated with an issue resides within a dead code portion.

9. The system according to claim 7, wherein at least one of the preconditions comprises checking whether a value returned by a specific flow contains one or more characters selected from a predefined list of characters.

10. The system according to claim 7, wherein at least one of the preconditions comprises checking whether specific path constraints that yields a specific issue, render the issue not viable and the flow associated with the path infeasible.

11. The system according to claim 7, wherein at least one of the preconditions comprises checking whether a specific flow is associated with a mode of execution selected from a predefined list of modes of code execution.

12. The system according to claim 7, wherein at least one of the preconditions comprises checking requirements on the history of an execution of a flow associated with an issue.

13. A computer program product comprising:
- a computer readable storage medium having computer readable program embodied therewith, the computer readable program comprising:
- computer readable program configured to model a computer code into a model that defines sources, sinks, and flows;
- computer readable program configured to apply static analysis to the code or the model, to yield reports indicative of at least one issue relating to one or more of the flows;
- computer readable program configured to generate preconditions for eliminating false-positive issues in the reports, based on the model and user-provided input; and
- a computer readable program configured to apply the generated preconditions to the reports for eliminating false-positive issues in the reports.

14. The computer program product according to claim 13, wherein at least one of the preconditions comprises checking whether a flow associated with an issue resides within a dead code portion.

15. The computer program product according to claim 13, wherein at least one of the preconditions comprises checking whether a value returned by a specific flow contains one or more characters selected from a predefined list of characters.

16. The computer program product according to claim 13, wherein at least one of the preconditions comprises checking whether specific path constraints that yields a specific issue, render the issue not viable and the flow associated with the path infeasible.

17. The computer program product according to claim 13, wherein at least one of the preconditions comprises checking whether a specific flow is associated with a mode of execution selected from a predefined list of modes of code execution.

18. The computer program product according to claim 13, wherein at least one of the preconditions comprises checking requirements on the history of an execution of a flow associated with an issue.

* * * * *